United States Patent [19]
Harwell et al.

[11] Patent Number: 5,396,637
[45] Date of Patent: Mar. 7, 1995

[54] DATA PROCESSING SYSTEM WITH POWER-FAIL PROTECTED MEMORY MODULE

[75] Inventors: John C. Harwell; Michael R. Rusnack, both of Boise, Id.

[73] Assignee: Hewlett-Packard Company, Palo Alto, Calif.

[21] Appl. No.: 26,148

[22] Filed: Mar. 2, 1993

[51] Int. Cl.⁶ .................... G06F 15/00; G06F 11/30
[52] U.S. Cl. .................... 395/750; 371/66; 371/9.1; 371/10.1
[58] Field of Search .................... 395/750; 371/66, 9.1, 371/10.1; 365/226, 229

[56] References Cited
U.S. PATENT DOCUMENTS

| | | | |
|---|---|---|---|
| 4,744,097 | 5/1988 | Haruhara | 371/66 |
| 4,942,579 | 7/1990 | Goodlander et al. | 371/10.1 |
| 4,959,774 | 9/1990 | Davis | 371/66 |
| 4,965,714 | 10/1990 | Knecht | 371/10.1 |
| 4,980,836 | 12/1990 | Carter et al. | 364/200 |
| 4,989,205 | 1/1991 | Dunphy, Jr. et al. | 371/10.1 |
| 4,989,206 | 1/1991 | Dunphy, Jr. et al. | 371/10.1 |
| 5,220,671 | 6/1993 | Yamagishi | 395/750 |
| 5,230,055 | 7/1993 | Katz et al. | 395/750 |
| 5,230,074 | 7/1993 | Canova, Jr. et al. | 395/750 |
| 5,239,652 | 8/1993 | Seibert et al. | 395/750 |
| 5,283,790 | 2/1994 | Kawashita | 371/10.1 |

*Primary Examiner*—Allen R. MacDonald
*Assistant Examiner*—George Davis

[57] ABSTRACT

A data processing system preserves the contents of a volatile memory in the event of a power-loss and restores the contents upon a power-up. The system includes an AC line monitor which signals when a power loss is imminent; volatile memory modules; and a central processor which executes programs in conjunction therewith. At any specific time during program execution, the volatile memory stores data indicative of the system's state. A backup disk drive is connected to each volatile memory module and is associated with a backup battery. The backup battery is of limited capacity and only enables sufficient operation of the disk drive and volatile memory to enable a memory dump onto the disk drive from the volatile memory. A logic circuit is responsive to a signal from the line monitor to activate the backup battery and to control the volatile memory module and the backup disk drive to effect a transfer of all stored data in the volatile memory. Thus, upon a subsequent power up, a system state in existence at the time of the power loss can be reestablished by reading out the contents of each backup disk drive into its associated volatile memory module.

8 Claims, 1 Drawing Sheet

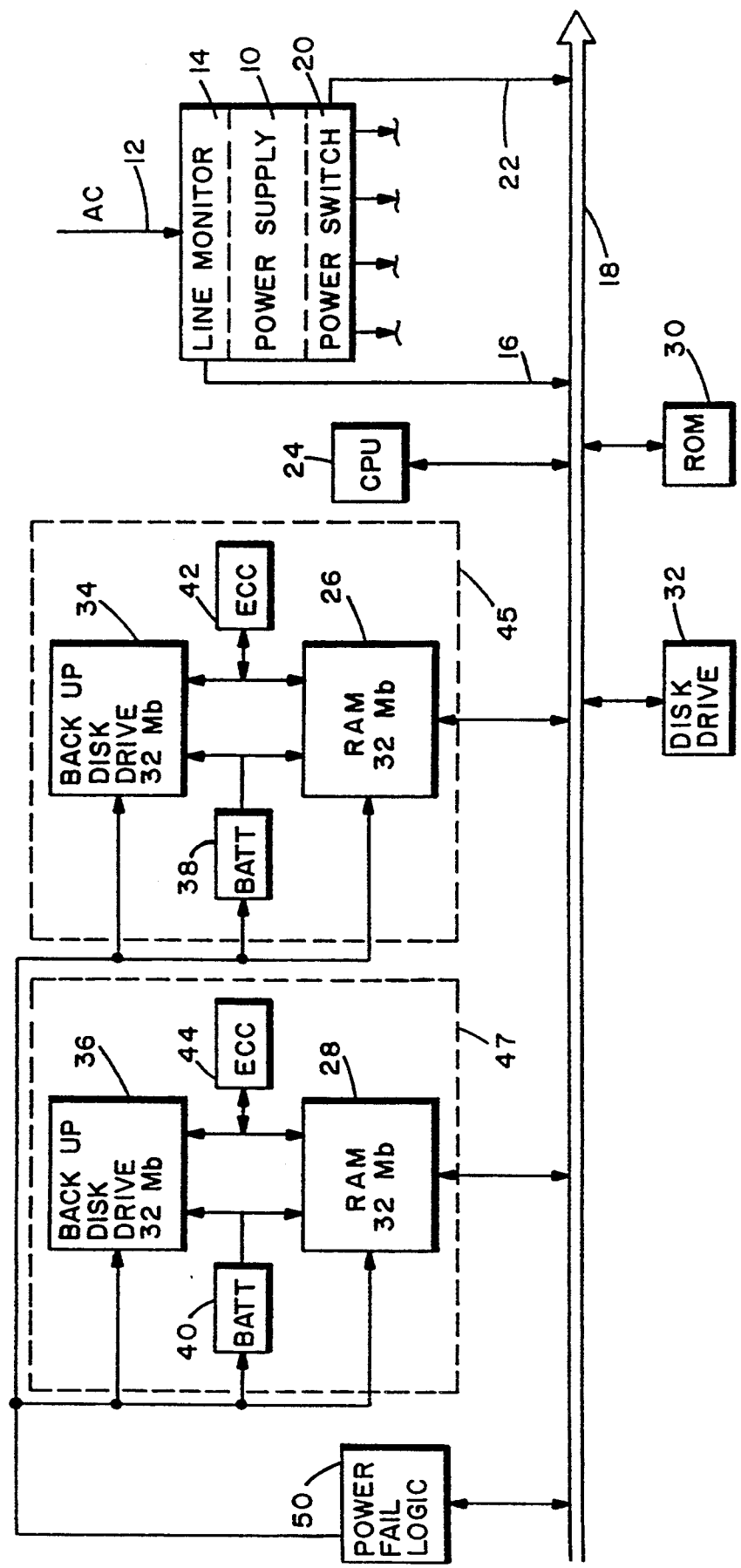

DATA PROCESSING SYSTEM WITH POWER-FAIL PROTECTED MEMORY MODULE

FIELD Of THE INVENTION

This invention relates to data processing systems which protect the contents of volatile memory in the event of a power failure and, more particularly, to a data processing system having a volatile memory whose contents are automatically transferred to a nonvolatile memory upon a power termination or power failure.

BACKGROUND OF THE INVENTION

One reason for the increased success of multi-user computing systems arises from the fact that their designs include substantial provisions for coping with power failures. Such systems have facilities that afford the user the luxury of experiencing a loss of primary power, and enable the system to resume processing as if no loss of supply voltage had been experienced. In general, such systems require battery back-up or some other power supply replacement that is activated in the event of a failure of the A/C main supply.

With the increasing complexity of multi-user computing systems,and a resulting geometric increase in the amount of available solid state memory in such systems, power fail protection requires substantially increased amounts of standby power. More specifically, the backup power supply must enable the data in the volatile memory bank to be stored prior to a total loss of supply voltage. The volatile memory must then be returned to the same state after power is restored. At typical speeds, using a disk to store data dumped from the volatile memory, substantial time may be required to accomplish such storage actions. For instance, if a multi-user system includes a 1-gigabyte quantity of data, such transfer would consume over 3 minutes of disk operating time. Future systems are expected to grow upwards of 4-gigabytes and thus, it would theoretically take over 10 minutes to save the data and another 10 minutes to reload.

Recent advances in the disk drives have led to the introduction of extremely small disk drives that are both inexpensive and high capacity. For instance, one such disk drive employs 1.3 inch disks, is smaller than a normal cigarette package, stores 40 megabytes and is available at a cost of less than $400. Such disk drives enable the storage of substantial amounts of data in a small package at very low cost.

Accordingly, it is an object of this invention to provide a data processing system with a volatile memory module whose contents are protected in the event of a power failure.

It is another object of this invention to provide a data processing system with power protected random access memory wherein nonvolatile memory modules are provided for the sole purpose of memory protection.

It is yet another object of this invention to provide a memory protection system that enables a computer, after a power-off and a subsequent power-on, to immediately reconstitute a memory state that existed at the power-off stage.

SUMMARY OF THE INVENTION

A data processing system preserves the contents of a volatile memory in the event of a power-loss and restores the contents upon a power-up. The system includes an AC line monitor which signals when a power loss is imminent; volatile memory modules; and a central processor which executes programs in conjunction therewith at any specific time during program execution. The volatile memory stores data indicative of the system's state. A backup disk drive is connected to each volatile memory module and is associated with a backup battery. The backup battery is of limited capacity and only enables sufficient operation of the disk drive and volatile memory to enable a memory dump onto the disk drive from the volatile memory. A logic circuit is responsive to a signal from the line monitor to activate the backup battery and to control the volatile memory module and the backup disk drive to effect a transfer of all stored data in the volatile memory. Thus, upon a subsequent power up, a system state in existence at the time of the power loss can be reestablished by reading out the contents of each backup disk drive into its associated volatile memory module.

DESCRIPTION OF THE DRAWING

The FIGURE is a block diagram of a preferred embodiment of the invention.

DETAILED DESCRIPTION OF THE INVENTION

Referring to the FIGURE, a power supply 10 receives its main supply from A/C line 12. Power supply 10 is provided with a line monitor module 14 which continuously monitors the potentials on A/C line 12 to determine any change in level thereon. In the known manner, line monitor 14, upon sensing a voltage change on line 12 that falls below a predetermined threshold, generates a signal on line 16 that a power failure is imminent. That signal is placed on a bus 18 which provides the main communication pathway for the data processing system.

Power supply 10 also has a power switch 20 that controls the on or off state of power supply 10. A line 22 signals the state of power switch 20 to bus 18.

The data processing system of FIG. 1 is provided with a central processing unit 24 and a plurality of associated random access memory modules (RAMs) 26, 28, etc. Each RAM is volatile in nature and provides working memory for CPU 24. The data processing system also includes a read-only memory 30 and one or more disk drives 32 interconnected with bus 18.

Each RAM module is provided with a backup disk drive (e.g., disk drives 34, 36 for RAM modules 26 and 28, respectively). Each RAM module also has associated therewith a backup rechargeable battery (e.g., 38, 40) and an error correction control (ECC) module (e.g., 42 and 44).

The RAM in the data processing system of the FIGURE is segregated into memory storage capacity sizes that match the data storage capacity of the respective backup disk drives. Thus, each RAM module (e.g., 26) has the same data storage capacity as its backup disk drive (e.g., 34). In this manner, a backup disk drive is capable, at any time, of storing the entire contents of its associated RAM module. Since each backup disk drive is a dedicated disk drive, it serves no function other than to provide for backup storage in the event of a power loss.

ECC modules 42 and 44 provide for the generation of error correction codes between the respective RAMs and their backup disk drives. Each RAM module, backup disk drive, battery and ECC module may be packaged on a single, pluggable circuit board (shown schematically by dashed boxes 45 and 47). In the 32 megabyte configuration shown in the FIGURE, data in RAM module 26 can be fed to backup disk drive 34 in less than 10 seconds. Thus, battery 38 merely needs to power RAM 26 and backup disk drive 34 for the 10 second period necessary to perform the data transfer operation. Of course, battery 38 should have some additional capacity so as to provide for a safety margin. Nevertheless, since the data transfer can occur so quickly, battery 38 need not have substantial storage capacity.

A power fail logic module 50 provides the necessary control signals to RAMs 26, 28 and backup disk drives 34 and 36, respectively, to enable data transfers therebetween. Similarly, power fail logic module 50 switches batteries 38 and 40 into the circuits to enable the functioning of their respectively connected backup disk drives and RAMs.

In operation, line monitor 14 continually monitors AC input line 12 to determine when, and if, the voltage level thereon falls below a predetermined threshold. Upon sensing such a fall, line monitor 14 generates a power fail imminent signal on line 16 which is fed by bus 18 to power fail logic module 50. Power fail logic module 50 responds by causing batteries 38 and 40 to switch into their respective circuits and signals RAMs 26 and 28 to dump their data onto their respectively connected backup disk drives 34, 36. As each backup disk drive 34 and 36 is also powered directly from power supply 10, each is up to speed when the signal to transfer data emanates from power fail logic module 50. Batteries 38 and 40 maintain the rotation speed of their respectively connected backup disk drives, at least until after the data transfer from the respectively connected RAMs is completed.

Upon a subsequent power up, CPU 24 causes each of backup disk drives 34 and 36 to read their stored data back into their respectively connected RAM modules 26 and 28. Thus the system state is reestablished identically to that which was in existence at the time of the shut down.

If the data processing system is a portable personal computer, the system shown in the FIGURE also enables the system state to be saved upon power switch 20 shutting off the system. Under such conditions, the power off signal on line 22 may be caused to enable power fail logic 50 to institute the above-described backup procedure so as to enable the machine state of the data processing system to be reestablished upon power switch 20 being turned on again.

It should be understood that the foregoing description is only illustrative of the invention. Various alternatives and modifications can be devised by those skilled in the art without departing from the invention. For instance, the capacity of each backup disk drive can be larger than its associated RAM capacity, with the excess disk storage capacity being used for storage of error correction code data. Accordingly, the present invention is intended to embrace all such alternatives, modifications and variances which fall within the scope of the appended claims.

What is claimed is:

1. A data processing system wherein data stored in volatile memory is preserved in the event of a power loss, said data processing system comprising:
line monitor means coupled to an input power source for signalling when a power loss is imminent;
volatile memory means;
central processing means for executing programs in conjunction with said volatile memory means, said volatile memory means storing data indicative of a system state of said data processing system at times during execution of said programs;
backup disk drive means connected to said volatile memory means;
backup battery means connected to said backup disk drive means and said volatile memory means; and
logic means coupled to said line monitor means and responsive to a signal from said line monitor means to activate said backup battery means and to control said volatile memory means to transfer all stored data in said volatile memory means to said backup disk drive means, whereby, upon a subsequent power up, a system state in existence at said signal from said line monitor means can be reestablished by reading out data stored in said backup disk drive means to said volatile memory means.

2. The data processing system of claim 1 wherein said backup disk drive means is comprised of a plurality of disk drives and said volatile memory means is comprised of a plurality of random access memory (RAM) modules, each said RAM module connected to a said backup disk drive and each said backup disk drive having sufficient memory capacity to accommodate all data in a connected RAM module.

3. The data processing system recited in claim 2 wherein each said connected RAM module and backup disk drive is provided with a dedicated backup battery.

4. The data processing system as recited in claim 1 wherein said backup battery means is provided with a predetermined electric storage capacity and is rechargeable, said back-up battery means enabling a complete transfer of data in said volatile memory means to said backup disk drive means, said predetermined electric storage capacity enabling said back-up battery means to power said transfer of data with a power safety margin.

5. The data processing system as recited in claim 3 wherein said backup battery means has just sufficient power capacity, with a safety margin, to enable a complete transfer of data in said volatile memory means to said backup disk drive means.

6. The data processing system as recited in claim 5 wherein each said RAM module and connected backup disk drive is connected with an error correction code generating means for assuring data integrity of data transferred between a RAM module and a backup disk drive.

7. The data processing system as recited in claim 3 wherein each said RAM module, connected backup disk drive and dedicated battery are mounted on a removable memory card as an integral unit.

8. A data processing system wherein data stored in volatile memory is preserved in the event of a power termination, said data processing system comprising:
power switch means coupled to a power source for said data processing system for controlling the on/off state of said power source and for signalling when said power source is off;
volatile memory means;
central processing means for executing programs in conjunction with data stored in said volatile memory means, at any one time said volatile memory means storing data indicative of a system state of said data processing system;

backup disk drive means connected to said volatile memory means;

backup battery means connected to said backup disk drive means and said volatile memory means; and logic means coupled to said power switch means and responsive to a power off signal from said power switch means to activate said backup battery means and to control said volatile memory means to transfer all stored data in said volatile memory means to said backup disk drive means so that upon a power on signal from said power switch means, a system state in existence at said power off signal can be reestablished by reading out stored data from said backup disk drive means to said volatile memory means.

* * * * *